(12) United States Patent
Miyajima et al.

(10) Patent No.: US 10,920,897 B2
(45) Date of Patent: *Feb. 16, 2021

(54) THERMO VALVE AND METHOD OF MANUFACTURING SAME

(71) Applicant: YAMADA MANUFACTURING CO., LTD., Kiryu (JP)

(72) Inventors: Junichi Miyajima, Kiryu (JP); Yoshiharu Fuju, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 94 days.

This patent is subject to a terminal disclaimer.

(21) Appl. No.: 16/268,801

(22) Filed: Feb. 6, 2019

(65) Prior Publication Data
US 2019/0293200 A1    Sep. 26, 2019

(30) Foreign Application Priority Data

Mar. 26, 2018    (JP) .................................. 2018-057630

(51) Int. Cl.
    *F16K 31/00*    (2006.01)
    *G05D 23/185*    (2006.01)
    *B23P 15/00*    (2006.01)

(52) U.S. Cl.
    CPC .......... *F16K 31/002* (2013.01); *B23P 15/001* (2013.01); *G05D 23/1852* (2013.01)

(58) Field of Classification Search
CPC .......... F16K 31/002; F16K 3/26; F16K 3/314; B23P 15/001; B23P 11/005; G05D 23/022; G02M 37/0035
See application file for complete search history.

(56) References Cited

U.S. PATENT DOCUMENTS 4,716,928 A * 1/1988 Kussel ................. F16K 17/046
    137/494
5,076,328 A * 12/1991 Lyon ...................... F16K 17/06
    137/540

(Continued)

FOREIGN PATENT DOCUMENTS

CN          103486308 A    *  1/2014
DE    10 2017 106 474      10/2017

(Continued)

OTHER PUBLICATIONS

Weifeng et al., Vacuum Protection Valve used at Super-low Temeprature, Jan. 1, 2014, CN103486308A, Whole Document (Year: 2014).*

(Continued)

*Primary Examiner* — Larry L Furdge
(74) *Attorney, Agent, or Firm* — Rankin, Hill & Clark LLP (57) ABSTRACT

A thermo valve is configured by coupling a valve body to a thermo actuator via a coupling part. The valve body has at least two recesses extending in a peripheral direction. The thermo actuator and the valve body overlap each other in a direction of an axial centerline to cover at least one of the recesses. The coupling part is formed by at least a certain section of the overlapping portion being depressed toward the axial centerline and another section of the thermo actuator fitting in the recesses. The depression of the coupling part has a shape elongated in a longitudinal direction along the axial centerline.

8 Claims, 9 Drawing Sheets

(56) References Cited

U.S. PATENT DOCUMENTS

| 10,288,177 B2* | 5/2019 | Shoji .................... F16K 11/0716 |
| 2002/0130515 A1* | 9/2002 | Mlyajima .............. B29C 66/112 |
| | | 285/201 |
| 2012/0247582 A1* | 10/2012 | Lamb .................... F16K 11/044 |
| | | 137/468 |
| 2017/0284243 A1* | 10/2017 | Miyajima ............. F16K 31/002 |

FOREIGN PATENT DOCUMENTS

| JP | 10-252913 | 9/1998 |
| WO | 2012/153893 | 11/2012 |

OTHER PUBLICATIONS

German Search Report dated Oct. 9, 2019, 9 pages.
German Office Action dated Oct. 28, 2019, 3 pages.

* cited by examiner

THERMO VALVE AND METHOD OF MANUFACTURING SAME

FIELD OF THE INVENTION

The present invention relates to a thermo valve that controls a flow rate of a fluid on the basis of temperature of the fluid.

BACKGROUND OF THE INVENTION

In order to control a flow rate of a fluid, a valve is disposed in a flow path. Conventional technique related to such valve is disclosed in, for example, Japanese Patent Application Laid-Open Publication No. Hei 10-252913.

A valve, such as the one disclosed in Japanese Patent Application Laid-Open Publication No. Hei 10-252913, includes a cylindrical spool, a valve seat that is press-fitted and caulked in the spool, and a valve body that can contact the valve seat.

The valve seat has a groove formed in an outer periphery (outer wall) such that the groove has a depth toward an axial centerline. After the valve seat is press-fitted in the spool, the spool is pressed toward the groove. As a result, a certain section of the spool is forced into the groove. In other words, the valve seat is caulked to the spool. Because the caulking is carried out after the press-fitting, it is possible to more firmly fix the components to each other.

SUMMARY OF THE INVENTION

In the meantime, there is known a thermo valve that controls a flow rate of a fluid on the basis of temperature of the fluid. The thermo valve has a valve body that is operatively coupled to, for example, a thermo actuator that is driven on the basis of the temperature of the fluid. The valve body repeats forward and backward movements (retracting movements) as the temperature changes. Thus, it is necessary to prevent the valve body from separating from the thermo actuator or reduce such possibility.

An object of the present invention is to provide an arrangement that can firmly fix the valve body to the thermo actuator.

According to one aspect of the present invention, there is provided a thermo valve including: a thermo actuator in which a rod moves as temperature of a fluid changes; a valve body coupled to the thermo actuator at a coupling part and configured to control a flow rate of the fluid; and a return spring configured to bias the thermo actuator and the valve body in a returning direction, one of the thermo actuator and the valve body having at least two recesses that have depths in a radial direction, respectively, the recesses being formed at positions offset from each other in a direction of an axial centerline, the thermo actuator and the valve body overlapping each other in a direction of the axial centerline such that the thermo actuator and the valve body cover at least one of the recesses, at least a certain section of the overlapping portion having a depression, which has a depth toward the axial centerline, and another section of the other of the thermo actuator and the valve body fitting in at least one of the recesses to form the coupling part, and the depression of the coupling part having a shape that is elongated in a longitudinal direction along the axial centerline.

In the present invention, the depression of the coupling part is formed to have a shape elongated in a longitudinal direction along the axial centerline. In addition, a certain section of the thermo actuator or the valve body fits in at least one of the recesses. It was confirmed that it was possible to couple the valve body to the thermo actuator more firmly, as compared to a configuration in which the depression of the coupling part was formed in a circumferential direction such that the depression of the coupling extended in a direction perpendicular to the axial centerline. If a particular area is pressed by the same pressing force, the pressing force per a unit area becomes larger as the area of the pressing face exposed to the recess becomes smaller. We assumed that an amount of fitting-in became large in the recess as the pressing force per a unit area was increased, and that it resulted in the enhanced coupling.

In addition, the amounts of forward movements of the rods of the thermo actuators are slightly different from each other for the respective products even if the temperature is the same. It is considered that the difference in the amount of the forward movement is adjusted by the overlapping amount between the thermo actuator and the valve body. Specifically, a large amount of overlapping is given to the thermo actuator and the valve body if the rod of the thermo actuator has a large amount of forward movement whereas a small(er) amount of overlapping is given to the thermo actuator and the valve body if the rod of the thermo actuator has a small(er) amount of forward movement. Such adjustment is carried out because the valve body can be situated at the predetermined position when the temperature has a predetermined value. The thermo valve of the present invention has at least two recesses. Even if the amount of overlapping between the thermo actuator and the valve body is adjusted for each of the thermo valves, it is easy to cause the recess to face the overlapping portion. It is possible to fix the valve body more firmly while absorbing the unavoidable difference in the amount of forward movement for the rods of the respective thermo actuators.

According to another aspect of the present invention, there is provided a method of manufacturing a thermo valve that includes a thermo actuator in which a rod moves in accordance with temperature of a fluid, and a valve body coupled to the thermo actuator and configured to control a flow rate of the fluid, the method including:

a preparation step of preparing the thermo actuator and the valve body;

a forward movement amount measuring step of placing the prepared thermo actuator in an atmosphere at predetermined temperature, and measuring an amount of forward movement of the rod in this situation;

a step of determining an amount of overlapping between the valve body and the thermo actuator based on the amount of forward movement such that a length of the thermo valve takes a constant value at the predetermined temperature;

an overlapping step of overlapping the valve body and the thermo actuator based on the amount of overlapping such that at least one of recesses, which are formed in one of the thermo actuator and the valve body and have depths in a radial direction, is covered; and a caulking step of caulking the overlapping portion of the valve body and the thermo actuator, the caulking step being carried out by pressing the valve body and the thermo actuator toward an axial centerline from a radially outward position with a jig or jigs, a pressing face of the jig(s) having a short side and a long side, which is longer than the short side, and the pressing with the jig(s) being carried out with the long side extending generally in parallel to the axial centerline of the thermo actuator, and the short side extending generally in parallel to the recesses.

In the present invention, the caulking step is carried out by pushing the jig with the long side of the jig being generally in parallel to the axial centerline of the thermo actuator and the short side being generally in parallel to the recess. It was confirmed that the valve body could be coupled to the thermo actuator more firmly than when the jig was pushed with the short side of the jig being generally in parallel to the axial centerline of the thermo actuator and the long side overlapping the recess. If a particular area is pressed by the same pressing force, the pressing force per a unit area becomes larger as the area of the pressing face exposed to the recess becomes smaller. We assumed that an amount of fitting-in became large in the recess as the pressing force per a unit area was increased, and that it resulted in the enhanced coupling. Because the edge of the recess is generally perpendicular to the long side of the jig, it is possible to have a large amount of deformation at the groove edge.

In addition, the overlapping step causes the valve body to overlap the thermo actuator on the basis of an amount of overlapping that is decided from an amount of forward movement of the rod at the predetermined temperature. The amounts of forward movements of the rods of the thermo actuators are slightly different from each other for the respective products even if the temperature is the same. The difference in the amount of the forward movement is adjusted by the overlapping amount between the thermo actuator and the valve body. Specifically, a large amount of overlapping is given to the thermo actuator and the valve body if the rod of the thermo actuator has a large amount of forward movement whereas a small(er) amount of overlapping is given to the thermo actuator and the valve body if the rod of the thermo actuator has a small(er) amount of forward movement. With such adjustment, the valve body can be situated at the predetermined position when the temperature has a predetermined value. The thermo actuator or the valve body of the present invention has at least two recesses. Even if the amount of overlapping between the thermo actuator and the valve body is adjusted for each of the thermo valves, it is easy to cause the recess to face the overlapping portion. It is possible to fix the valve body more firmly while absorbing the unavoidable difference in the amount of forward movement for the rods of the respective thermo actuators.

BRIEF DESCRIPTION OF THE DRAWINGS

Several preferred embodiments of the present invention will now be described in detail with reference to the accompanying drawings, in which.

DETAILED DESCRIPTION OF THE PREFERRED EMBODIMENTS

Embodiments of the present invention will be described below with reference to the accompanying drawings. It should be noted that the terms "up," "down," "top," "bottom," "front," "rear," "left" and "right" in the following description designate the directions defined on the basis of the drawing sheet. The symbol "Up" in the drawings designates an upward direction and the symbol "Dn" in the drawings designates a downward direction.

Embodiments

Figure 1:
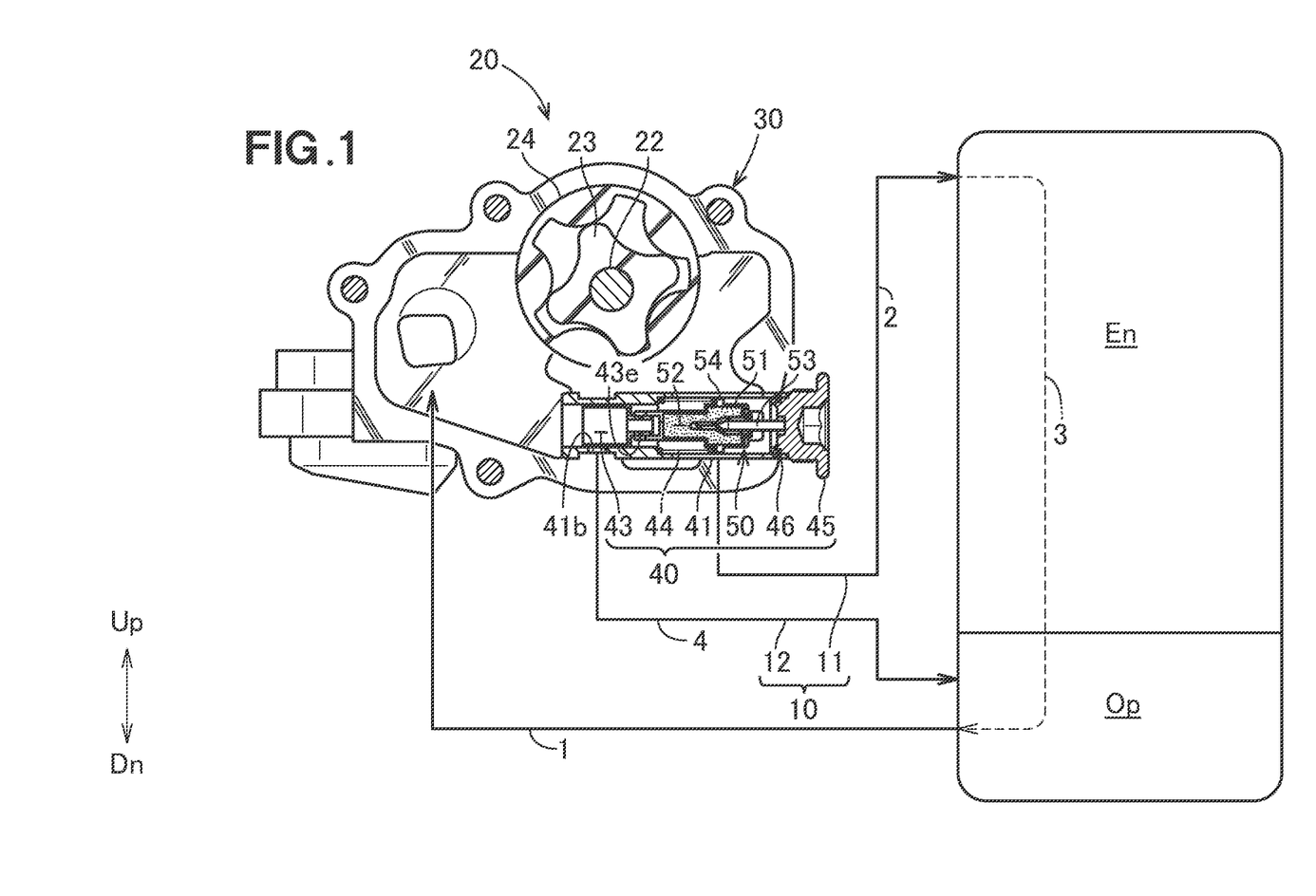
FIG. 1 is a schematic view of an oil passage that is equipped with a thermo valve according to an embodiment of the present invention.

Referring to FIG. 1, a thermo valve 40 of this embodiment of the invention is housed in, for example, an oil pump 20 disposed in an oil passage 10. The oil passage 10 is a flow path that connects an oil pan Op to the oil pump 20, and connects the oil pump 20 to an engine En such that the oil is circulated through the oil passage.

The oil passage 10 includes a main passage 11 and a bypass passage 12 that bypasses a certain section of the main passage 11.

The oil pump 20 is a so-called internal (inscribed) gear pump. The oil pump 20 includes a rotating shaft portion 22 that is rotated as the engine En is activated, an inner rotor 23 that is rotated by the rotating shaft portion 22, an outer rotor 24 that surrounds the periphery of the inner rotor 23 and is rotated by the inner rotor 23, and a thermo valve 40 that is activated on the basis of the temperature of the oil. The rotating shaft portion 22, the inner rotor 23, the outer rotor 24 and the thermo valve 40 are housed in a housing 30.

The rotating shaft portion 22 is connected to, for example, a crankshaft. The rotating shaft portion 22 may be connected to an arbitrary member such as a camshaft, other than the crankshaft. In other words, an external source of driving power is not limited to the crankshaft.

The thermo valve 40 is disposed below a lower end of the outer rotor 24, and extends along the horizontal axis. The end of the thermo valve 40 is situated at a position below the rotating shaft portion 22 when viewed from the front. It should be noted that "when viewed from the front" means when the oil pump 20 is looked at from an axial direction of the rotating shaft portion 22.

Figure 2:
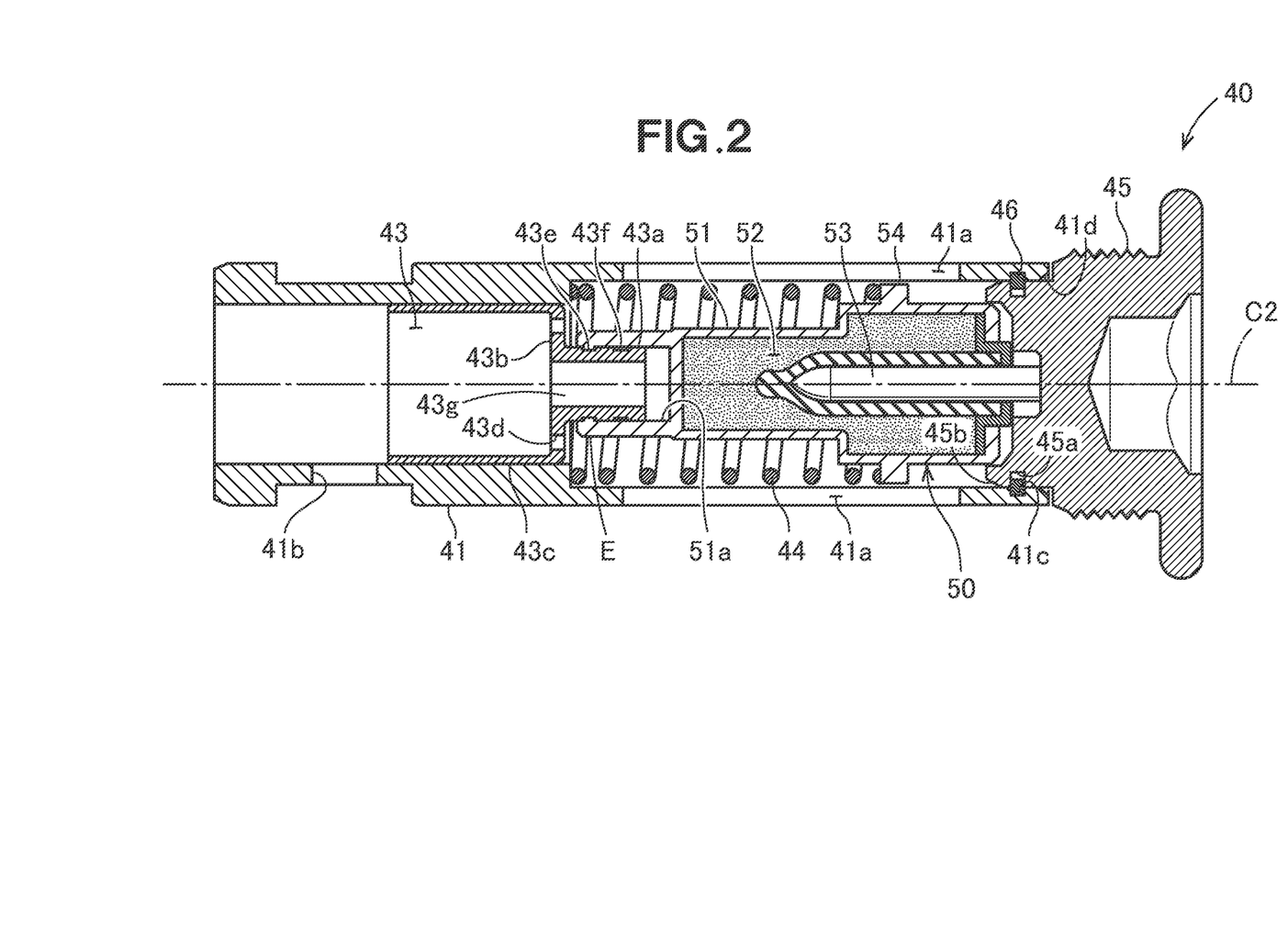
FIG. 2 is an enlarged view of the thermo valve shown in FIG. 1.
Figure 3:
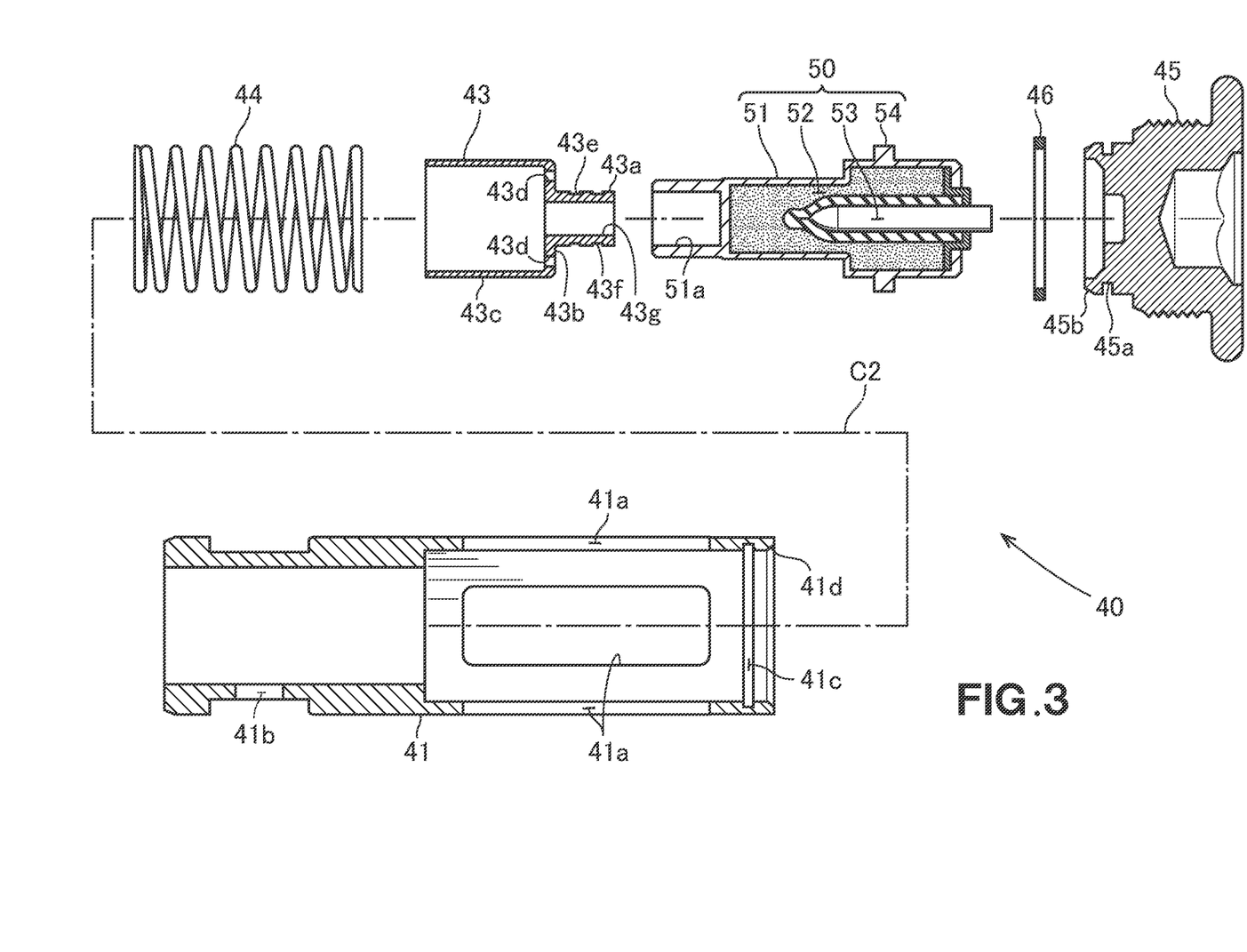
FIG. 3 is an exploded view of the thermo valve shown in FIG. 2.

Referring to FIG. 2 and FIG. 3, the thermo valve 40 includes a thermo actuator 50 that is activated on the basis of the temperature of the oil, a valve body 43 operatively coupled to the thermo actuator 50, and a return spring 44 that biases the thermo actuator 50 and the valve body 43 in a return direction. The thermo actuator 50, the valve body 43 and the return spring 44 are housed in a generally cylindrical case 41. One end of the case 41 is closed by an actuator lid 45. A C-shaped stop ring 45, which is interposed between the case 41 and the actuator lid 45, prevents the actuator lid 45 from disengaging from the case 41.

The case 41 has window portions 41a in the outer periphery (outer wall) of the thermo actuator 50 at four or two positions, a case hole 41b that is opened and closed by the valve body 43, a stop ring receiving groove 41c that receives the C-shaped stop ring 46 therein, and a female tapered portion 41d that is formed at a position closer to the front end than the stop ring receiving groove 41c. The tapered portion 41d has a diameter that increases toward the front end of the case.

That portion of the case 41 which is present in the vicinity of the case hole 41b is thinner than other portions of the case (i.e., has a smaller outer diameter than other portions), and this thinner portion extends in an entire circumferential direction of the case. Thus, the oil can smoothly exit regardless of a phase of the case hole 41b.

The oil always flows through window portions 41a while the oil is being circulated.

The thermo actuator 50 includes an actuator main body 51, a wax 52 loaded in a hole formed in one end of the actuator main body 51 such that the wax expands as the temperature rises, a rod 53 that is pushed out of the actuator main body 51 as the wax expands, and a large diameter portion 54 that protrudes from the actuator main body 51 in a radially outward direction. The large diameter portion 54 receives (contacts) an end of the return spring 44, and serves as a spring receiving seat.

Figure 4:
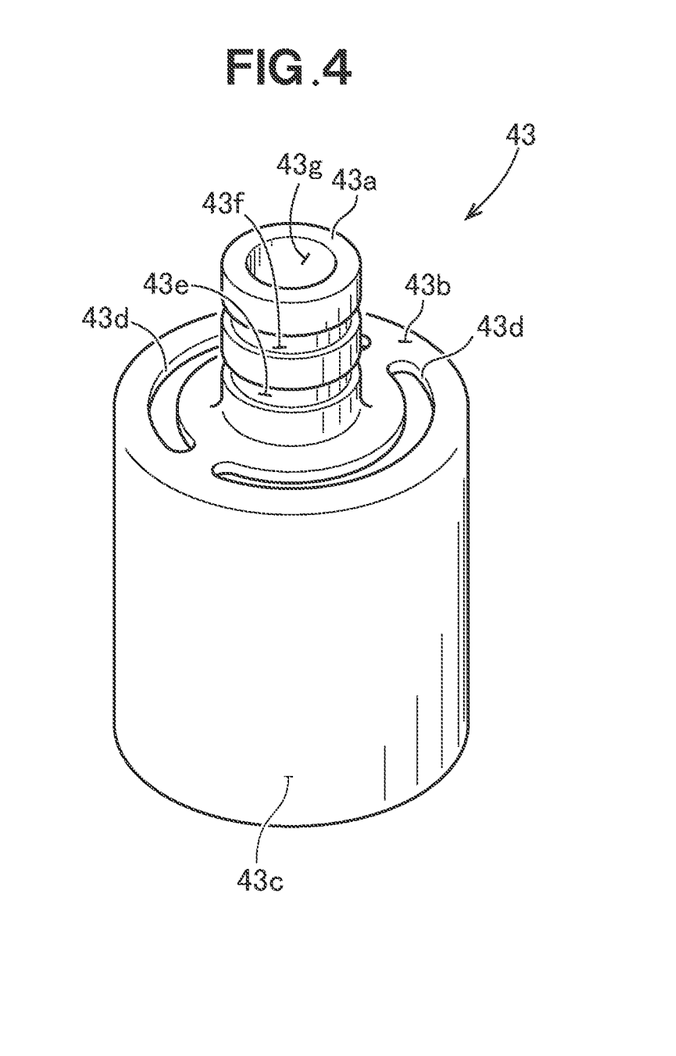
FIG. 4 is a perspective view of a valve body shown in FIG. 3.

Referring to FIG. 2 and FIG. 4, the valve body 43 is coupled and coupled (tightened) to the thermo actuator 50 via a coupling part E. The valve body 43 includes a valve small diameter portion 43a that is received in and coupled to a hole 51a formed at the other end of the actuator main body 51, a valve step portion 43b that expands from the end of the valve small diameter portion 43a toward the outer periphery, and a valve large diameter portion 43c that extends in the axial direction from the outer end of the valve step portion 43b. The valve large diameter portion 43c has a diameter greater than the valve small diameter portion 43a. It should be noted that the valve body 43 may be coupled to the rod of the thermo actuator disposed in the opposite direction.

The valve step portion 43b has an oil passing hole 43d, through which the oil can flow. Two recesses 43e and 43f are formed in the valve small diameter portion 43a such that each of the recesses has a depth toward the axial centerline C2. Also, a hole that penetrates the center portion in the axial direction is formed in the valve small diameter portion 43a. In other words, the valve body 43 has the valve body through hole 43g that penetrates along the axial centerline C2. Thus, it is possible to easily push the valve body 43 into the hole 51a without the air resistance.

Each of the recesses 43e and 43f has a depth in the radial direction. The recesses 43e and 43f are formed at positions offset from each other in the axial centerline C2. Although each of the recesses 43e and 43f is formed continuously in the circumferential direction, it may be formed intermittently in the circumferential direction.

A front end of the actuator main body 51 is caulked and fits in the recess 43e. It can be said that the recess 43e is a certain section of the coupling part E, which is a coupling portion between the valve body 43 and the thermo actuator 50.

It should be noted that the front end of the actuator main body 51 may be caulked and fit in the recess 43f. The reason for this configuration will be described later. If the front end of the actuator main body 51 fits in the recess 43f, it can be said that the recess 43f is a certain section of the coupling portion E, which is a coupling portion between the valve body 43 and the thermo actuator 50.

It should also be noted that the recesses 43e and 43f may be formed in an inner periphery (inner surface) of the actuator main body 51. It should further be noted that the front end of the actuator main body 51 may fit in (forced in) the inner periphery of the valve small diameter portion 43a. In this configuration, the recesses 43e and 43f are formed in the inner periphery of the valve small diameter portion 43a or the outer periphery of the actuator main body 51. It is satisfactory as long as the coupling part E is formed when a certain section of the thermo actuator 50 or a certain section of the valve body 43 fits in at least one of the recesses 43e and 43f.

Figure 5:
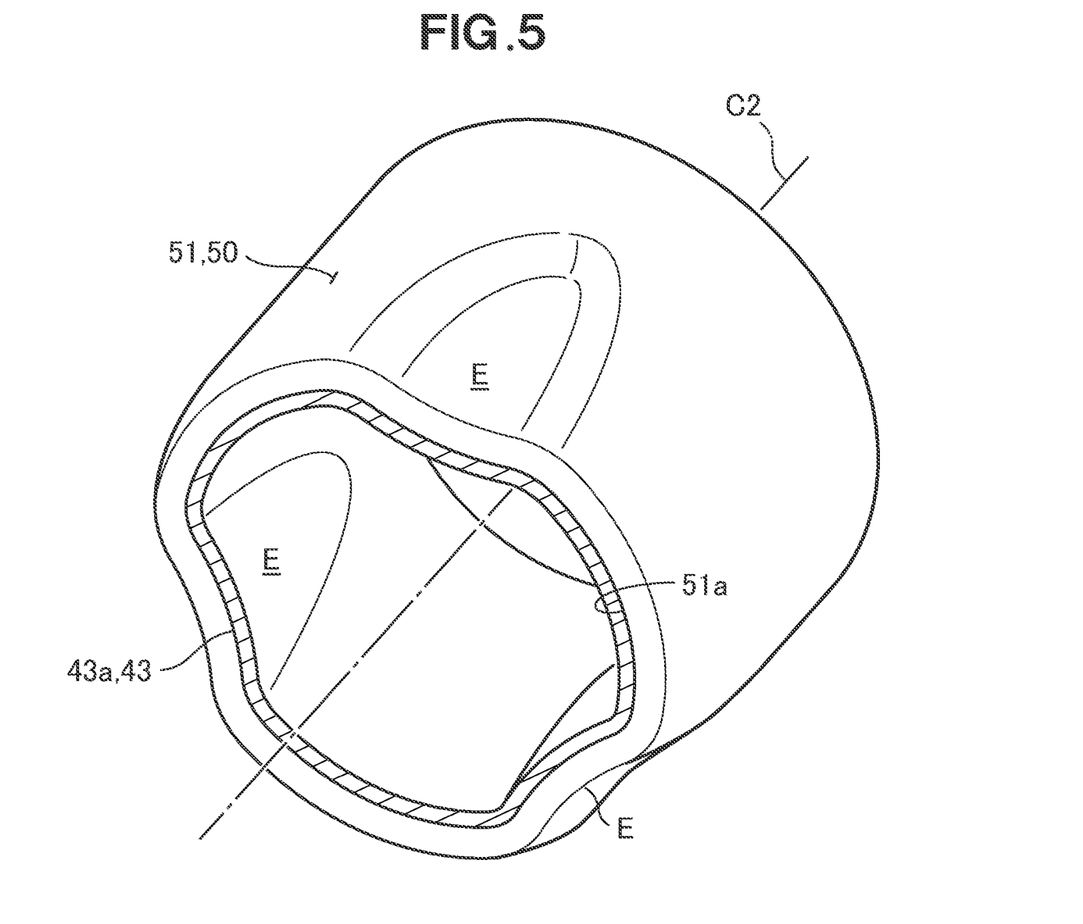
FIG. 5 is a perspective view of a coupling part shown in FIG. 2.

Referring to FIG. 5, those portions of the thermo actuator 50 and the valve body 43 which overlap each other are partially concave toward the axial centerline C2. The concave (depression) of the coupling part E has a shape elongated in a longitudinal direction along the axial centerline C2.

Referring to FIG. 3, the actuator lid 45 has a stop ring receiving groove 45a, in which the C-shaped stop ring 46 is received, at the front end thereof, and a male tapered portion 45b that is formed closer to the front end than the stop ring receiving groove 45a. The male tapered portion 45b has a decreasing diameter.

The outer diameter of the valve large diameter portion 43c is slightly smaller than the inner diameter of the case 41. The inner diameter of the case 41 is large around the large diameter portion 54, and small around the valve body 43. The portion which has the changing diameter is shaped like a step, and receives (contacts) the end of the return spring 44 such that it serves as the spring receiving (bearing) seat.

A method of manufacturing the thermo valve 40 will be described.

The case 41, the thermo actuator 50, the return spring 44, the actuator lid 45, the valve body 43 and the C-shaped stop ring 46 are prepared (preparation step).

Figure 6A:
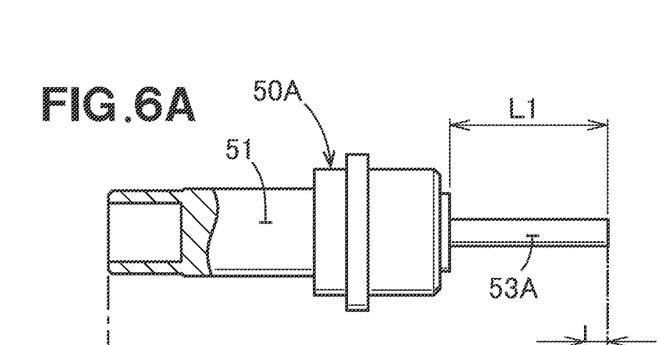
FIG. 6A is a view useful to describe a step of measuring an amount of forward movement for one of the thermo valves disposed in an atmosphere at predetermined temperature.
Figure 6B:
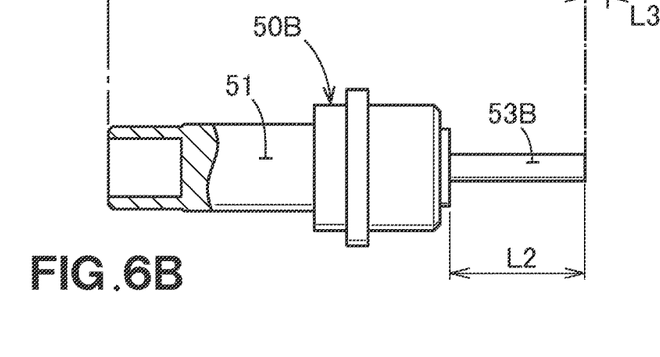
FIG. 6B is a view useful to describe a step of measuring an amount of forward movement for another thermo valve disposed in the atmosphere at the predetermined temperature.

Referring to FIG. 6A and FIG. 6B, the thermo actuators 50A and 50B are then placed in an atmosphere at predetermined temperature (e.g., 80 degrees C.) ("A" and "B" are suffixes to designate that they are different from each other. This applies in the following description). By placing the thermo actuators in the atmosphere at the predetermined temperature, the wax (see FIG. 2) loaded in the thermo actuators 50A and 50B expands and the rods 53A and 53B move forward. Amounts of forward movement L1 and L2 of the rods 53A and 53B at this occasion are measured, respectively (forward movement measuring step). Even if the rods 53A and 53B are at the same temperature, the amounts of forward movement L1 and L2 are slightly different from each other because the individual products are not exactly the same.

Figure 6C:
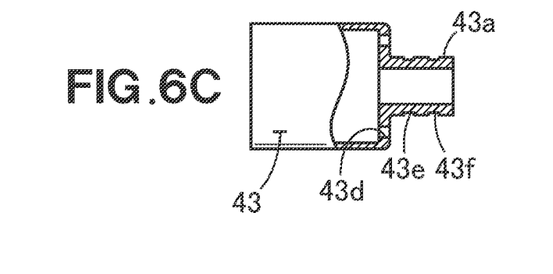
FIG. 6C is a view useful to describe a step of determining an amount of overlapping.

Referring also to FIG. 6C, an amount of overlapping of the valve body 43 and each of the thermo actuators 50A and 50B is decided on the basis of the amount of the respective forward movement L1, L2 such that the length of one of the thermo valves and the length of the other thermo valve become predetermined length at the predetermined temperature (overlapping amount determining step).

Figure 6D:
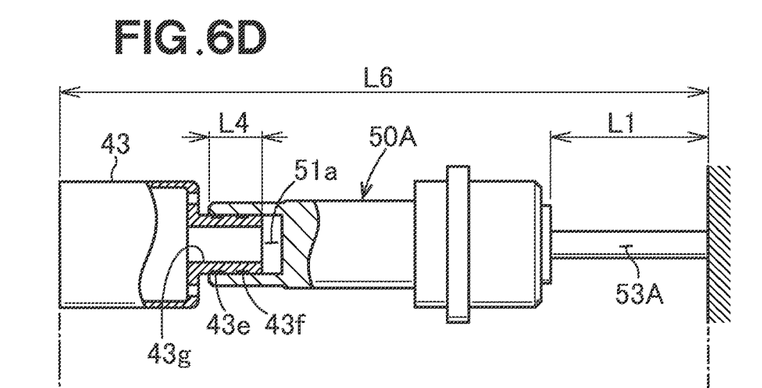
FIG. 6D is a view useful to describe an overlapping step with regard to the thermo valve shown in FIG. 6A.
Figure 6E:
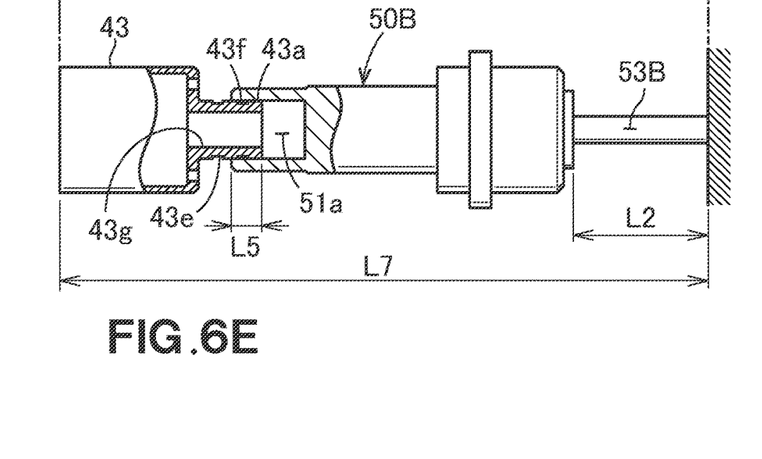
FIG. 6E is a view useful to describe an overlapping step with regard to the thermo valve shown in FIG. 6B.

Referring to FIG. 6D and FIG. 6E, the thermo actuator 50A that has the rod 53A with a larger amount of forward movement L1 is given a large amount of overlapping L4 with the valve body 43 whereas the thermo actuator 50B that has the rod 53B with a smaller amount of forward movement L2 is given a small amount of overlapping L5 with the valve body 43.

The gap between the bottom of the hole 51a and the front end of the valve body 43 may be referred to as an adjustment margin (adjustment tolerance) to absorb the dimension errors. When the amount of forward movement L1 is the maximum value and the amount of forward movement L2 is the minimum value, the difference between the maximum value of the forward movement and the minimum value of the forward movement is denoted by L3 (see FIG. 6A). The depth of the hole 51a and the length of the small diameter portion 43a of the valve are set to be greater than the difference L3.

In order to cover and close at least one of the recesses 43e and 43f, the valve body 43 overlaps the respective thermo actuator 50A, 50B on the basis of the respective amount of overlapping L4, L5 (overlapping step). As a result, the length L6 from the front end of the rod 53A to the front end of the valve body 43 becomes equal to the length L7 from the front end of the rod 53B to the front end of the valve body 43 at the predetermined temperature. In other words, L6=L7 is established.

Figure 7A:
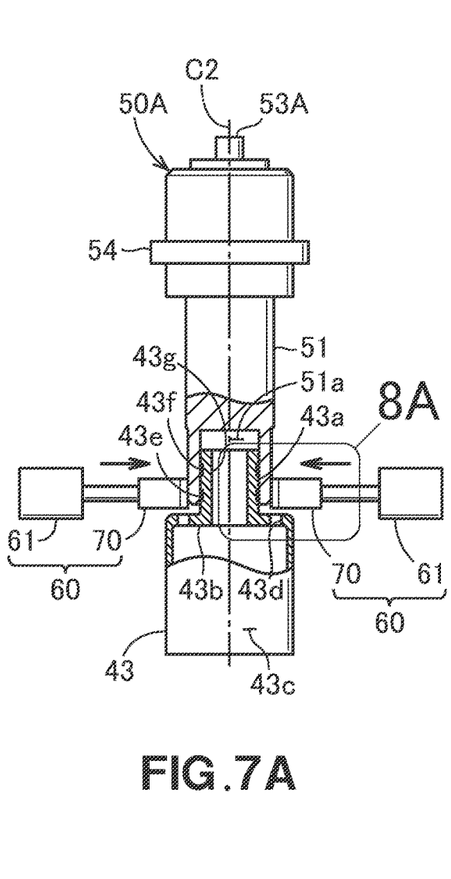
FIG. 7A is a view useful to describe a situation when jigs are disposed in the vicinity of a recess.
Figure 8A:
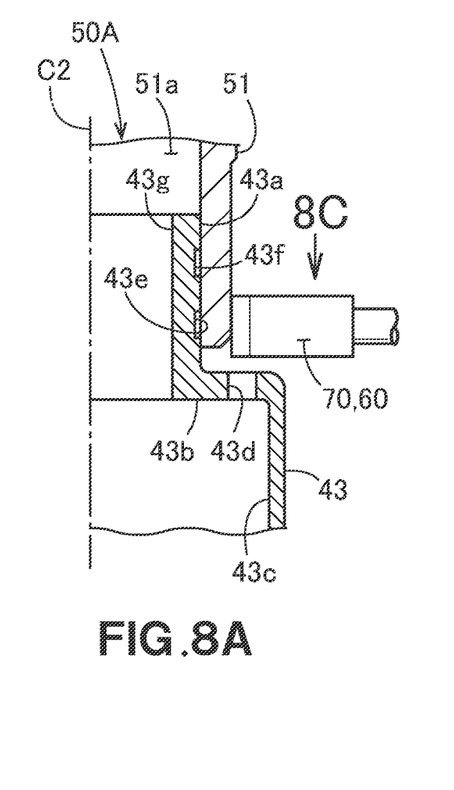
FIG. 8A is an enlarged view of a part 8A shown in FIG. 7A.

Referring to FIG. 7A and FIG. 8A, jigs 60 are brought to the vicinity of the recess 43e in order to couple the valve body 43 to the thermo actuator 50A.

Each of the jigs 60 has an actuator 61 and a pressing member 70 that is supported by the actuator 61 to press the valve body 43 or the thermo actuator 50A. It should be noted that each of the jigs 60 for pressing the thermo actuator 50B (see FIG. 7C) has the same configuration.

Figure 8B:
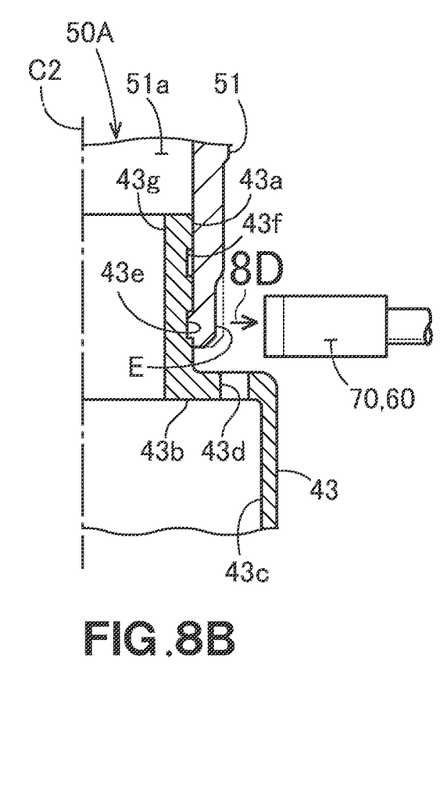
FIG. 8B is an enlarged view of a part 8B shown in FIG. 7B.
Figure 8C:
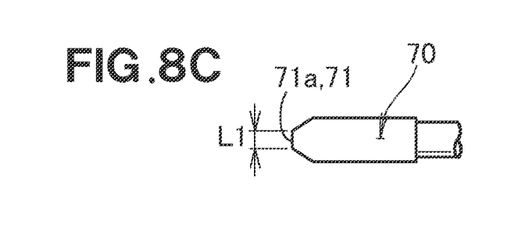
FIG. 8C is a drawing when viewed from the direction of the arrow 8C in FIG. 8A.
Figure 8D:
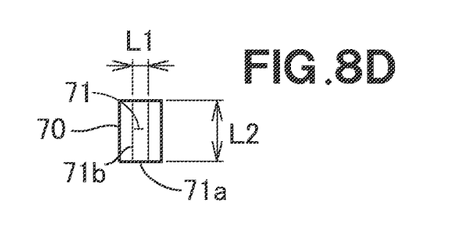
FIG. 8D is a drawing when viewed from the direction of the arrow 8D in FIG. 8B.

Referring to FIG. 8C and FIG. 8D, FIG. 8C is a drawing when viewed from the direction of the arrow 8c in FIG. 8A, and FIG. 8D is a drawing when viewed from the direction of the arrow 8d in FIG. 8B. The front end of the pressing member 70 is a pressing face 71 that is used to press the actuator main body 51 (see FIG. 8A). The pressing face 71 has a generally rectangular shape that has a short side 71a whose length is L1 and a long side 71b whose length is L2, which is longer than the shorter side 71a. It should be noted that the shape of the pressing face 71 is not limited to the rectangular shape. It is satisfactory if the shape of the pressing face has a short side and a long side, which are different in length.

Referring also to FIG. 8A, each of the jigs 60 is brought into the vicinity of the outer periphery of the actuator main body 51 such that the long side 71b extends generally in parallel to the axial centerline C2 of the thermo actuator 50 and the short side 71a extends generally in parallel to the recess 43e.

Figure 7B:
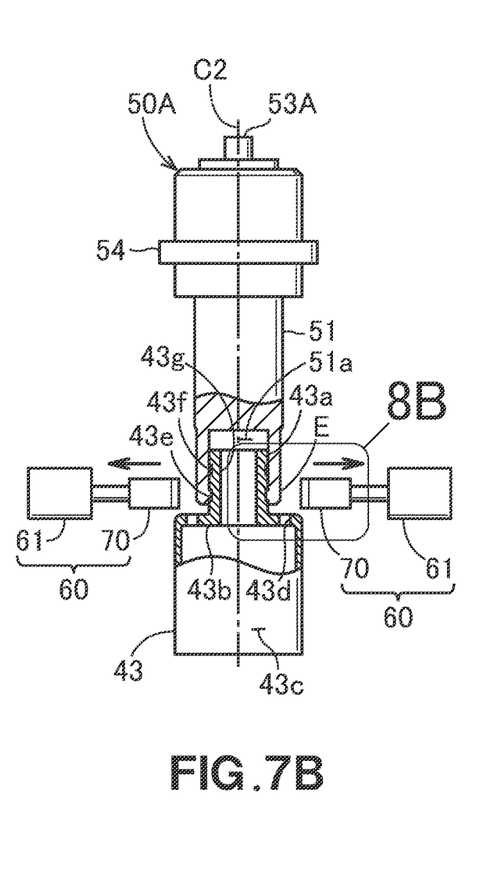
FIG. 7B is a view useful to describe a caulking step for the thermo valve shown in FIG. 6A.

Referring to FIG. 7B and FIG. 8B, the actuator main body 51 is pressed by the pressing member 70 toward the axial centerline C2 from the outer periphery of the actuator main body 51. In other words, the valve body 43 and the thermo actuator 50 are pressed toward the axial centerline C2 from the radially outward position. The overlapping portion of the thermo actuator 50 and the valve body 43 are pressed and caulked (caulking step). As the actuator main body 51 deforms, a certain section of the actuator main body 51 fits in (forced in) the recess 43e. Thus, the valve body 43 is coupled to the thermo actuator 50A. This coupling forms the coupling part E.

Figure 7C:
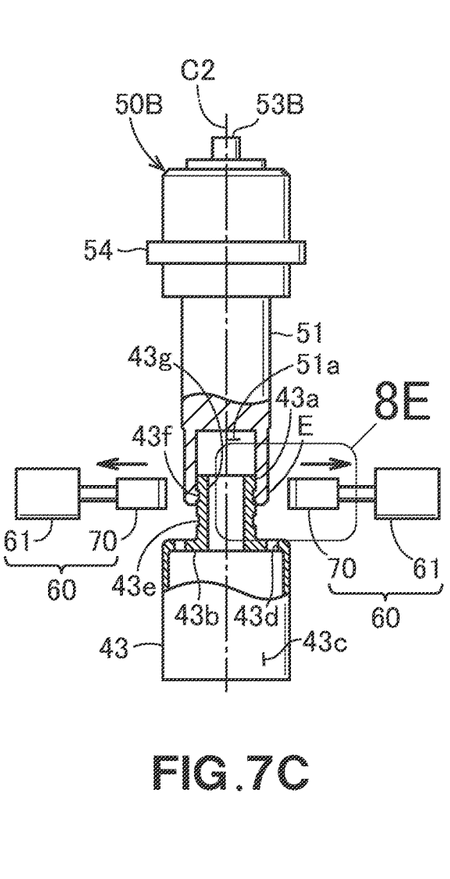
FIG. 7C is a view useful to describe a caulking step for the thermo valve shown in FIG. 6B.
Figure 8E:
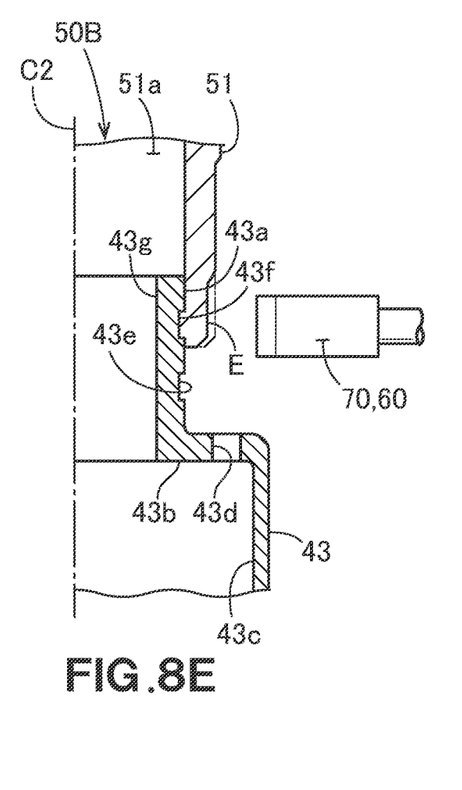
FIG. 8E is an enlarged view of a part 8E shown in FIG. 7C.

Referring to FIG. 7C and FIG. 8E, the above-described description applies when the other recess 43f only faces the thermo actuator 50B. The actuator main body 51 is pressed toward the axial centerline C2 from the outer periphery by the pressing member 70. In other words, the valve body 43 and the thermo actuator 50B are pressed toward the axial centerline C2 from the radially outward position. The overlapping portion of the thermo actuator 50B and the valve body 43 are pressed and caulked (caulking step). As the actuator main body 51 deforms, a certain section of the actuator main body fits in the recess 43f. Thus, the valve body 43 is coupled to the thermo actuator 50B. This coupling forms the coupling part E.

Referring to FIG. 5 and FIG. 8D, the pressed portions of the actuator main body 51 and the pressed portions of the valve body 43 are slightly depressed (slightly deform) toward the axial centerline C2. For example, there are three pressed portions, respectively (It should be noted that there may be four pressed portions or more, respectively, if the strength of the coupling is considered). Because the long side 71b extends in a direction along the axial centerline C2 (generally in parallel to the axial centerline C2), the deformed portion (depression) has a shape extending along the axial centerline C2, i.e., a shape elongated in a longitudinal direction. If the long side 71b is pressed in a direction perpendicular to the axial centerline C2, the deformed portion is elongated (deforms) in a circumferential direction. Thus, it is possible to recognize in which direction the pressing member 70 is directed when the coupling step is carried out. The depression of the coupling part E has a shape elongated in a longitudinal direction along the axial centerline C2.

Referring to FIG. 3, the thermo actuator 50 to which the return spring 44 and the valve body 43 are coupled is placed in the case 41 (placing step).

Subsequently, the actuator lid 45 is attached to one end of the case 41 in which the thermo actuator 50 that has the return spring 44 and the valve body 43 coupled thereto is received (lid attaching step).

The lid attaching step will be described more in detail. The C-shaped stop ring 46 is forced (pushed) along and against the male tapered portion 45b. The male tapered portion 45b enlarges the diameter of the C-shaped stop ring 46. As the C-shaped stop ring is further pushed, the C-shaped stop ring 46 engages (fits) in the stop ring receiving groove 45a. Then, when the actuator lid 45 is pushed into the case 41, the diameter of the C-shaped stop ring 46 becomes smaller at the female tapered portion 41d. As the actuator lid is further pushed, the C-shaped stop ring 46 engages (fits) in the stop ring receiving groove 41c. Accordingly, the actuator lid 45 is fixed to the end of the case 41. In this manner, the manufacturing of the thermo valve 40 is completed.

How the oil pump 20 operates will be described.

Referring to FIG. 1, the oil pump 20 is activated as the engine En operates. As the oil pump 20 is activated, the oil flows to the oil pump 20 from the oil pan Op, as indicated by the arrow 1. Then, the oil flows through the inner rotor 23 and the outer rotor 24, and is discharged to the outside of the oil pump 20. The discharged oil is caused to return to the engine En, as indicated by the arrow 2. Subsequently, the oil that has circulated through the engine En stays in the oil pan Op, as indicated by the arrow 3.

Figure 9A:
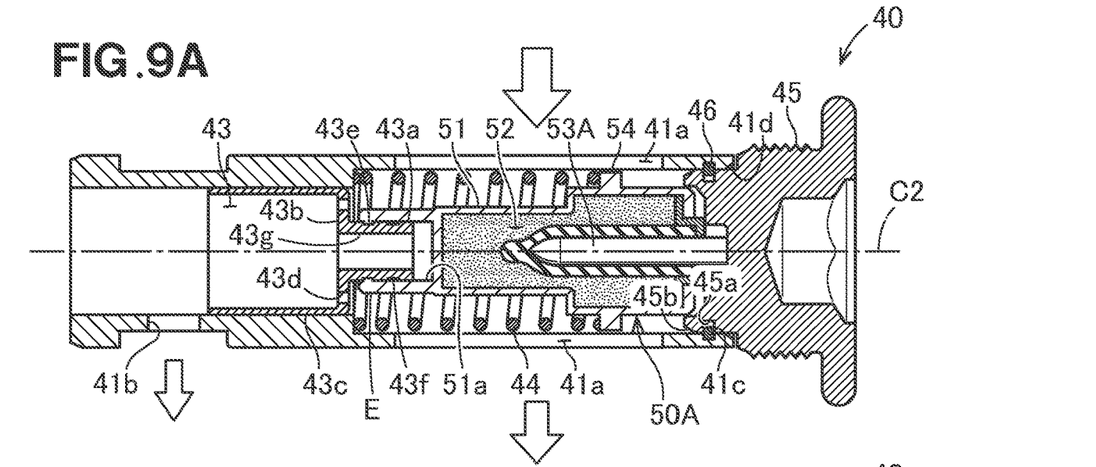
FIG. 9A is a view useful to describe the flow of the oil when the oil temperature is low.

Referring to FIG. 9A, this drawing shows the thermo valve 40 when the temperature of the oil is low. The temperature of the oils is low, for example, immediately after the starting up of the engine. When the temperature of the oil is low, the wax 52 is in a contraction state. Because of the biasing force of the return spring 44, the actuator main body 51 receives a force that is directed to the right in the drawing. As a result, the protruding amount of the rod 53A from the actuator main body 51 becomes small. In other words, the rod 53A retracts (moves backward) when the temperature of the oil is low, as compared to when the temperature of the oil is high. Thus, the valve body 43 opens the case hole 41b.

When the case hole 41b is open, some of the oil flows between the return spring 44 and the actuator main body 51, and passes through the oil passage hole 43d. As the oil passes through the oil passage hole 43d, the oil flows through the case hole 41b.

Referring to FIG. 1, the oil that has passed through the case hole 41b is caused to return to the oil pan Op via the bypass passage 12, as indicated by the arrow 4. In other words, some of the oil does not return to the engine En. Thus, it is possible to reduce the flow rate of the oil passing through the main passage 11, and suppress the oil pressure increase in the engine En.

The temperature of the engine En becomes high as the engine keeps running. After the temperature of the engine En becomes high, the engine En is cooled, and the oil temperature correspondingly becomes high. As the oil temperature becomes high, the temperature of the wax 52 in the thermo actuator 50 becomes high.

Figure 9B:
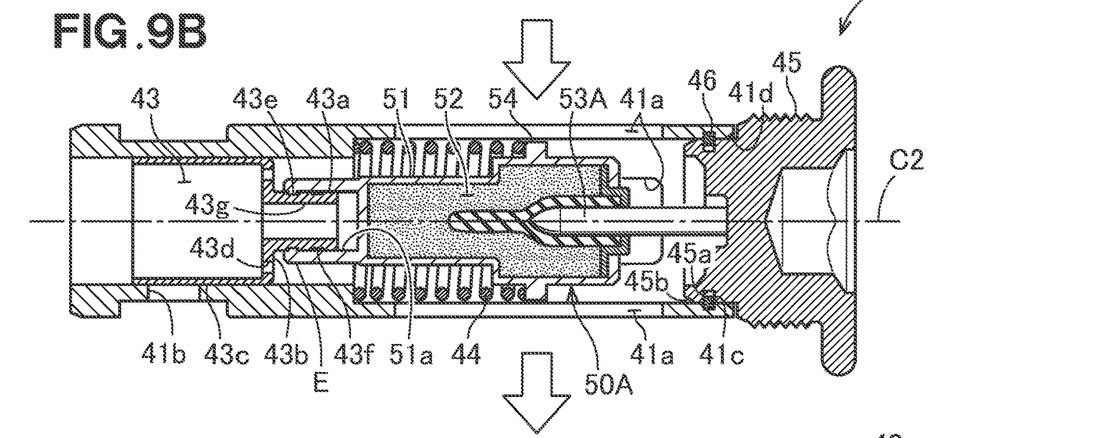
FIG. 9B is a view useful to describe the flow of the oil in one of the thermo valves shown in FIG. 6A when the oil temperature is high.

Referring to FIG. 9B, this drawing illustrates the thermo valve 40 when the temperature of the oil is high. When the temperature of the oil is high, the wax 52 expands. As the wax 52 expands, the rod 53A receives a force in a direction that causes the rod to escape from the actuator main body 51. However, because the front end of the rod 53A is in contact with the actuator lid 45, the rod 53A is prevented from moving forward. Accordingly, the actuator main body 51 moves backward relatively against the biasing force of the return spring 44, i.e., moves to the left in the drawing. Here, a forward movement of the rod 53 means that the rod moves forward relative to the actuator main body 51. While the rod 53 is moving forward (the actuator main body 51 is retracting), the valve body 43 closes the case hole 41b. Thus, the oil is only allowed to flow through the window portion 41a.

Referring to FIG. 1, when the case hole 41b is closed, the oil is only allowed to flow through the main passage 11, and not allowed to flow to the bypass passage 12. When the temperature of the engine En is high, an amount of the oil that flows to the engine En increases such that the engine En is efficiently cooled.

The above-described embodiment of the present invention has the following advantages.

Referring to FIG. 8B and FIG. 8D, the caulking step is carried out by arranging and pressing the jig 60, with the long side 71b of the jig 60 extending generally in parallel to the axial centerline C2 of the thermo actuator 50A, and the short side 71a overlapping the recess or the short side extending generally in parallel to the recess. It was confirmed that it was possible to more firmly couple the valve body 43 to the thermo actuator 50A, as compared to when the short side 71a of the jig extended generally in parallel to the axial centerline C2 of the thermo actuator 50A, the long side 71b overlapped the recess 43e and the jig was pressed. If the pressing is carried out with the same pressing force, a pressing force per a unit area increases as a pressing area (face) that is exposed to the recess 43e becomes smaller. It is assumed that an amount of fitting into the recess 43e increases upon reducing the pressing area exposed to the recess, and this results in the stronger coupling. Because the edge of the recess 43e is generally perpendicular to the long side 71b of the jig 60, it is possible to have a large amount of deformation at the groove edge.

In other words, the depression of the coupling part E is formed in a shape that is elongated in a longitudinal direction along the axial centerline C2. In addition, a certain section of the thermo actuator 50A or a certain section of the valve body 43 fits in at least one of the recesses. It was confirmed that it was possible to more firmly couple the valve body 43 to the thermo actuator 50A, as compared to a configuration in which the depression of the coupling part E extended in the circumferential direction such that the depression had a depth in a direction perpendicular to the axial centerline C2. If the pressing is carried out with the same pressing force, a pressing force per a unit area increases as a pressing area that is exposed to the recess 43e becomes smaller. It is assumed that an amount of fitting into the recess 43e increases upon reducing the pressing area exposed to the recess, and this results in the stronger coupling.

The foregoing description applies when the actuator main body 51 is forced to engage with the recess 43f, as shown in FIG. 8E.

Referring to FIG. 6D and FIG. 6E, the overlapping step is carried out such that the valve body 43 overlaps the respective thermo actuator 50A, 50B on the basis of the respective amount of overlapping L4, L5 that is decided from the respective amount of forward movement L1, L2 of the rod 53A, 53B at the predetermined temperature. Even if the rods 53A and 53B are at the same temperature, the amounts of forward movements L1 and L2 are slightly different from each other because of respective product tolerances. This difference in the amounts of forward movements L1 and L2 is adjusted by the amounts of overlapping of the L4 and L5 of the thermo actuators 50A and 50B and the valve body 43. Specifically, the thermo actuator 50A that has the rod 53A with a large amount of forward movement L1 is given a large amount of overlapping L4 with the valve body 43 whereas the thermo actuator 50B that has the rod 53B with a small(er) amount of forward movement L2 is given a small(er) amount of overlapping L5 with the valve body 43. Thus, it is possible to accurately place the valve body 43 at a predetermined position at the predetermined temperature.

Figure 9C:
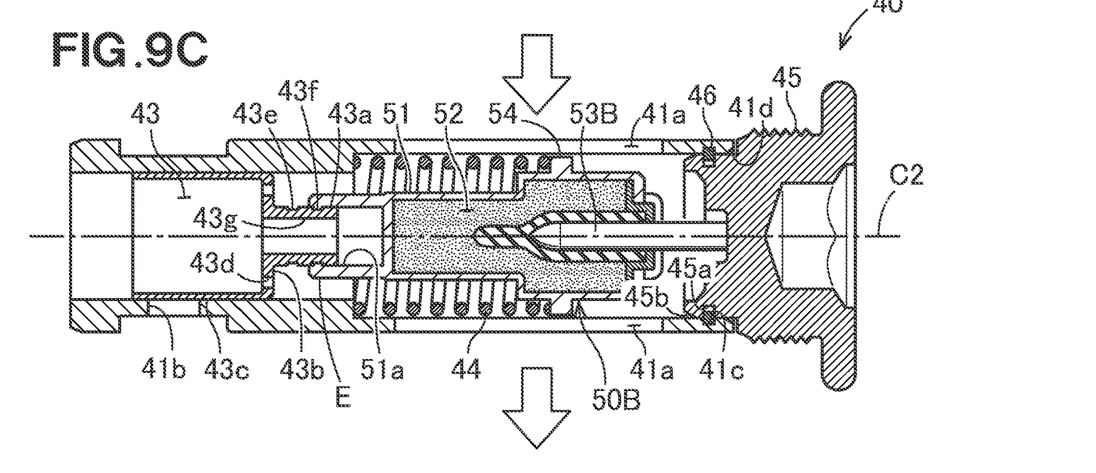
FIG. 9C is a view useful to describe the flow of the oil in the thermo valve shown in FIG. 6B when the oil temperature is high.

Referring to FIG. 9B and FIG. 9C, the valve body 43 of the embodiment of the present invention has at least two recesses 43e and 43f. Even if the amount of overlapping between the thermo actuator 50A, 50B and the valve body 43 is adjusted for each of the valve bodies 43, it is easy to cause the recesses 43e and 43 to face the overlapping portion. It is possible to fix the valve body 43 more firmly while absorbing the inevitably generated difference in the amounts of forward movements of the rods 53A and 53B of the thermo actuators 50A and 50B.

Referring to FIG. 6D, the valve body 43 is forced to overlap the actuator main body 51 of the thermo actuator 50A in the overlapping step. Then, the valve body 43 is caulked (coupled) to the actuator main body 51. When the valve body 43 is fixed to the rod 53, it is assumed that the rod 53A may fall due to the load applied during the caulking (coupling). If the rod 53A falls, the smooth movement of the rod 53A will be hindered. On the other hand, the actuator main body 51 naturally has a large outer diameter than the rod 53A. Thus, the load applied to the respective portions during the caulking is small. Accordingly, the possibility of deformation of the actuator main body due to the load applied during the caulking is smaller than the rod 53A. In addition, the influence on the smooth movement of the rod 53A is smaller when the actuator main body 51 deforms than when the rod 53A falls. Thus, it is possible to provide the thermo valve 40 that moves more smoothly. The other thermo actuator 50B also has similar advantages.

Further, the actuator main body 51 has the hole 51a that is a hollow formed at the end thereof and extending in the axial direction. The recess 43e is formed along the outer periphery (formed in the outer surface) of the valve body 43. The front end of the valve body 43 is forced into the hole 51a. Because the valve body 43 is received in the hole 51a formed in the actuator main body 51, it is possible to keep the entire length of the thermo valve 40 short (see FIG. 2). Because the recess 43e is formed in the outer surface of the valve body 43, the machining is easy, as compared to when the recess is formed in the inner surface of the hole 51a of the actuator main body 51.

It should be noted that although the thermo valve of the embodiment of the present invention is used in the oil pump in the foregoing description, the thermo valve may be used in other devices, and the thermo valve is not limited to the illustrated and described kind of configuration.

Although the thermo valve is configured to close the bypass passage when the temperature is high in the above-described embodiment, the thermo valve may be configured to close the bypass passage when the temperature is low. With such configuration, it is possible to reliably open the flow path when the temperature is a predetermined value.

In addition, although the thermo valve has the case 41 in the above-described embodiment, the thermo actuator may not have the case 41. The thermo actuator that does not have the case 41 is still able to have the valve body attached to an accurate position. In this case, the case hole for discharging the oil may be provided in (on) the oil passage 10 or the housing 30, not in the case 41.

As such, the present invention is not limited to the embodiment as far as the function and the advantages of the present invention are demonstrated.

INDUSTRIAL APPLICABILITY

The method of manufacturing the thermo valve according to the present invention is advantageously applied to a flow rate control valve that is used in an oil pump of a vehicle.

REFERENCE NUMERALS

40: Thermo valve
41: Case
43: Valve body
43e, 43f: Recess
43g: Valve body through hole
44: Return spring
45: Actuator lid
50: Thermo actuator
51: Actuator main body
51a: Hole
53: Rod
60: Jig
71: Pressing face
71a: Short side
71b: Long side
E: Coupling part

What is claimed is:

1. A thermo valve comprising:
a thermo actuator in which a rod moves as temperature of a fluid changes; a valve body coupled to the thermo actuator at a coupling part and configured to control a flow rate of the fluid; and a return spring configured to bias the thermo actuator and the valve body in a returning direction,
one of the thermo actuator and the valve body having two recesses that have depths in a radial direction, respectively, said two recesses being formed at positions offset from each other in a direction of an axial centerline,
the thermo actuator and the valve body overlapping each other in the direction of the axial centerline to define an overlapping portion, said overlapping portion corresponding to at least one of the two recesses such that said at least one of the two recesses is covered by said overlapping portion,
wherein a section of the overlapping portion has a depression, which has a depth extending toward the axial centerline, and an other of the thermo actuator and the valve body is fit into said at least one of the two recesses to form the coupling part, and
the depression of the coupling part has a shape that is elongated in a longitudinal direction along the axial centerline.

2. The thermo valve according to claim 1, wherein the thermo actuator has an actuator main body that supports the rod such that the rod can move forward and backward, and the valve body is coupled to the actuator main body.

3. The thermo valve according to claim 2, wherein the actuator main body has a hole, which is hollow and extends in an axial direction, at an end of the actuator main body, the recesses are formed in an outer periphery of the valve body, and a front end of the valve body is received in the hole.

4. The thermo valve according to claim 3, wherein the valve body has a valve body through hole that penetrates in the direction of the axial centerline.

5. The thermo valve according to claim 1, wherein three or more further coupling parts are formed in a circumferential direction, each further coupling part being identical to the coupling part.

6. A method of manufacturing a thermo valve that includes a thermo actuator in which a rod moves in accordance with temperature of a fluid, and a valve body coupled to the thermo actuator and configured to control a flow rate of the fluid, the method comprising the steps of:
a preparation step of preparing the thermo actuator and the valve body;
a forward movement amount measuring step of placing the prepared thermo actuator in an atmosphere at predetermined temperature, and measuring an amount of forward movement of the rod in this situation;

a step of determining an amount of overlapping between the valve body and the thermo actuator based on the amount of forward movement such that a length of the thermo valve takes a constant value at the predetermined temperature;

an overlapping step of overlapping the valve body and the thermo actuator based on the amount of overlapping such that at least one of recesses, which are formed in one of the thermo actuator and the valve body and have depths in a radial direction, is covered; and a caulking step of caulking an overlapping portion of the valve body and the thermo actuator, the caulking step being carried out by pressing the valve body and the thermo actuator toward an axial centerline from a radially outward position with a jig, a pressing face of the jig having a short side and a long side, said long side being longer than the short side, and said pressing with the jig being carried out with the long side extending generally parallel to the axial centerline of the thermo actuator, and the short side extending generally parallel to the recesses.

7. The method of manufacturing a thermo valve according to claim 6, wherein the overlapping step forces the valve body to overlap an actuator main body of the thermo actuator.

8. The method of manufacturing a thermo valve according to claim 6, wherein the caulking step comprises pressing the valve body at three or more locations.

* * * * *